(12) United States Patent
Tsai et al.

(10) Patent No.: US 10,009,073 B2
(45) Date of Patent: Jun. 26, 2018

(54) SYSTEM FOR ACQUIRING CHANNEL KNOWLEDGE AND METHOD THEREOF

(71) Applicants: MediaTek Inc., Hsinchu (TW); NATIONAL TAIWAN UNIVERSITY, Taipei (TW)

(72) Inventors: Cheng-Rung Tsai, Taipei (TW); An-Yeu Wu, Taipei (TW); Ju-Ya Chen, Taipei (TW); Qiang Zhou, Taipei (TW)

(73) Assignees: MediaTek Inc., Hsinchu (TW); NATIONAL TAIWAN UNIVERSITY, Taipei (TW)

( * ) Notice: Subject to any disclaimer, the term of this patent is extended or adjusted under 35 U.S.C. 154(b) by 0 days. days.

(21) Appl. No.: 15/399,754

(22) Filed: Jan. 6, 2017

(65) Prior Publication Data

US 2017/0272132 A1  Sep. 21, 2017

Related U.S. Application Data

(60) Provisional application No. 62/308,228, filed on Mar. 15, 2016.

(51) Int. Cl.
| | |
|---|---|
| *H04B 7/02* | (2018.01) |
| *H04B 7/0408* | (2017.01) |
| *H04B 7/06* | (2006.01) |
| *H04L 25/03* | (2006.01) |

(52) U.S. Cl.
CPC ......... *H04B 7/0408* (2013.01); *H04B 7/0617* (2013.01); *H04B 7/0684* (2013.01); *H04L 25/03961* (2013.01)

(58) Field of Classification Search
CPC .... H04B 7/0617; H04B 7/0413; H04B 7/088; H04B 7/0695; H04B 7/0408; H04B 7/0452; H04B 7/0639; H04B 7/0404; H04B 7/046; H04B 7/0684; H04B 7/0682; H04B 17/12; H04W 24/02; H04W 72/042; H04W 72/046; H04L 2025/03426; H04L 25/0204; H04L 25/0208; H04L 25/0224
See application file for complete search history.

(56) References Cited

U.S. PATENT DOCUMENTS 7,929,918 B2 * 4/2011 Niu ...................... H04B 7/0691
                                                        342/360

* cited by examiner

*Primary Examiner* — Rahel Guarino
(74) *Attorney, Agent, or Firm* — Chih Feng Yeh; Huntington IP Consulting Co., Ltd.

(57) ABSTRACT

A system for acquiring channel knowledge and a method thereof are provided. At least one transmitter generates multiple directional beams in different directions, next modulates the directional beams in the different directions with at least one spreading sequence, so as to enlarge the beam range of each directional beam in the different directions and use the modulated directional beams as training-specific beams in the different directions, and sweeps the multiple training-specific beams in the different directions by using a plurality of antennas, so that at least one receiver measures at least one training-specific beam, and determines the channel knowledge according to the measurement result and beam-related information associated with the at least one training-specific beam, so as to achieve a technical effect of reducing training overhead.

14 Claims, 7 Drawing Sheets

SYSTEM FOR ACQUIRING CHANNEL KNOWLEDGE AND METHOD THEREOF

CROSS-REFERENCE TO RELATED APPLICATIONS

The present application is based on, and claims priority from, U.S. Provisional Application Ser. No. 62/308,228, filed Mar. 15, 2016, the disclosure of which is hereby incorporated by reference herein in its entirety.

BACKGROUND

1. Technical Field

The present invention relates to a channel knowledge acquisition system and a method thereof, and more particularly to a system for acquiring channel knowledge with low training overhead by exploiting sparse nature of physical channel and a method thereof.

2. Description of Related Arts

Typically, in order to adopt beamforming techniques to compensate for high expected pathloss of signals in high-frequency bands, the channel knowledge is necessary at both a transmitter (or referred to as a base station) and a receiver (or referred to as an user equipment), wherein the channel knowledge usually includes angles-of-departure and angles-of-arrival of dominant propagation paths. In the conventional all-digital beamforming architecture, channel knowledge can be estimated based on utilization of reference signals in baseband. However, the acquisition of channel knowledge suffers from a subspace sampling limitation in the hybrid beamforming structure, where antenna array is driven by only a limited number of radio frequency chains (RF-chains) to avoid the fabrication cost and energy consumption from massive number of high-frequency mixed-signal components. In other words, the baseband cannot directly observe the entire channel dimension in the hybrid beamforming structure. To address this challenge, the training-based approach referred to as beam training is generally adopted to perform channel subspace sampling on an unknown channel by sweeping a plurality of transmission beams at the base station side and a plurality of reception beams at the user equipment side, respectively. After both sides complete the beam-sweeping, the user equipment may determine the channel knowledge according to the measurement result and the beam-related information associated with these beams.

In a straightforward approach for beam training, a set of directional transmission beams and reception beams with required resolutions are employed at both a base station and an user equipment to exhaustively scan all possible directions of physical channel, respectively. After the beam-sweeping, each user equipment finally reports indexes corresponding to beam pairs with high received power or good channel quality to the base station as channel knowledge. However, the exhaustive search method needs to sweep an extremely high number of directional beams especially for beamforming systems with massive antennas. Hence, it is difficult to obtain sufficient channel subspace samples within a practical coherence time to compute a meaningful estimate. Moreover, the training overhead is significant.

In view of this, some vendors propose technical solutions of hierarchical search method, which performs beam training by utilizing multi-resolution beam-codebooks collocated with divide-and-conquer search. A coarse-resolution beam-codebook may contain a small number of wide directional beams covering an intended spatial area, while a fine-resolution codebook may contain a large number of narrow directional beams covering the same intended spatial area, and that a wide directional beam may have the same/similar coverage as that of multiple narrow directional beams together. The divide-and-conquer search based on the feedback information is then carried out across the hierarchy of these codebooks, by determining the wide directional beam with the best received power or channel quality first on the coarse-resolution beam-codebook level, and then the narrow directional beam with the best received power or channel quality on the fine-resolution beam-codebook level. Both the base station and user equipment proceed in refining the angles-of-departure/angles-of-arrival associated with the dominant propagation paths until reach the required resolution. The required resolution is typically directly proportional to the number of antennas in beamforming systems. Compared with the exhaustive search method, the required training overhead in hierarchical search method increases with the number of antennas in log manner rather than linear manner. Therefore, the training overhead can be significantly reduced compared to the exhaustive search method.

However, the hierarchical search method has several main disadvantages. For example, hierarchical training procedure requires the usage of feedback channel during the training procedure. It may be challenging due to the complicated control plane and the unreliable transmission/reception without sufficient beamforming gains before beam training is completed. Moreover, when multiple user equipments are served in the same cell, the base station needs to search each possible direction according to the feedback information reported by each user equipment. Thus, the training overhead of the hierarchical search method may grow linearly with the increasing number of user equipment. It will be a major concern when we determine its adoption in multi-user cellular systems.

In summary, it can be seen that the prior art has encountered several issues of high training overhead for a long time. Therefore, it is necessary to propose an improved technical solution to resolve these problems.

SUMMARY

The present invention discloses a system for acquiring channel knowledge and a method thereof.

First, the present invention discloses a system for acquiring channel knowledge, where the system includes: at least one transmitter and at least one receiver. Each transmitter includes: a beam-generator module, a modulation module, and an antenna module. The beam-generator module is configured to generate multiple directional beams in different directions; the modulation module is configured to modulate the directional beams in the different directions by means of at least one spreading sequence, so as to enlarge the beam range of each directional beam in the different directions and use the modulated directional beams as multiple training-specific beams in the different directions; and the antenna module is configured to execute beam training by sweeping the training-specific beams in the different directions by means of a plurality of antennas. Each receiver is configured to measure at least one training-specific beam from the at least one transmitter, and determine channel knowledge according to the measurement result and beam-related information associated with the at least one training-specific beam.

In addition, the present invention discloses a method for acquiring channel knowledge, where the method is applied to an environment including at least one transmitter and a least one receiver, and includes steps: generating multiple directional beams in different directions by the at least one transmitter; modulating the directional beams in the different directions by the at least one transmitter by means of at least one spreading sequence, so as to enlarge the beam range of each directional beam in the different directions and use the modulated directional beams as multiple training-specific beams in the different directions; executing beam training by the at least one transmitter by sweeping the training-specific beams in the different directions by means of a plurality of antennas; and measuring at least one training-specific beam by the at least one receiver, and determining channel knowledge according to the measurement result and beam-related information associated with the at least one training-specific beam.

The system and the method disclosed in the present invention are as described above, and a difference from the prior art lies in: in the present invention, at least one transmitter generates multiple directional beams in different directions, next, modulates the directional beams in the different directions by means of at least one spreading sequence, so as to enlarge the beam range of each directional beam in the different directions and use the modulated directional beams as training-specific beams in the different directions, and sweeps the training-specific beams in the different directions by means of a plurality of antennas, so that the at least one receiver measures at least one training-specific beam, and determine channel knowledge according to the measurement result and beam-related information associated with the at least one training-specific beam.

By means of the foregoing technical solutions, the present invention can achieve a technical effect of reducing training overhead.

DETAILED DESCRIPTION

The following describes implementation manners of the present invention with reference to the accompanying drawings and embodiments, so that an implementation process in the present invention of how to apply the technical solutions to resolve a technical problem and achieve a technical effect can be fully understood and implemented.

Before a system for acquiring channel knowledge and a method thereof disclosed in the present invention are described, the present invention is briefly described first. In the present invention, we aim to reduce the training overhead in beamforming systems. Owing to the reduced diffraction and the substantial losses incurred at each reflection in high-frequency bands, propagation paths of physicals channel tend to be sparse as the number of antennas increases in beamforming systems. Via exploiting sparse nature of physical channels in high-frequency bands, we can utilize some advanced algorithms like compressive sensing to reduce the training overhead in beamforming systems. In other words, in order to avoid such as exhaustive search method that needs to sweep a large number of directional beams, sparse nature of the physicals channels in high-frequency bands is exploited, and a training-specific beams design based on compressive sensing is disclosed in the present invention to acquire channel knowledge via sweeping a few said training-specific beams. It should be particularly noted that practical hardware constraints of beamforming systems should be considered in the training-specific beams design, especially for hybrid baseband and radio frequency beamforming systems, such as a limited number of RF-chains and a limited resolution of radio frequency phase shifters. In addition, the present invention may be applied to different array architectures, for example: a full-connection array architecture and a sub-connection array architecture. A beamforming system with the full-connection array architecture utilizes several groups of radio frequency phase shifters to fully access all of the antennas, and provides beamforming in higher degrees of freedom, but its implementation complexity is relatively high; and a beamforming system with the sub-connection architecture utilizes only one group of radio frequency phase shifters with relatively low implementation complexity, however, sacrifices beamforming performance.

Figure 1A:
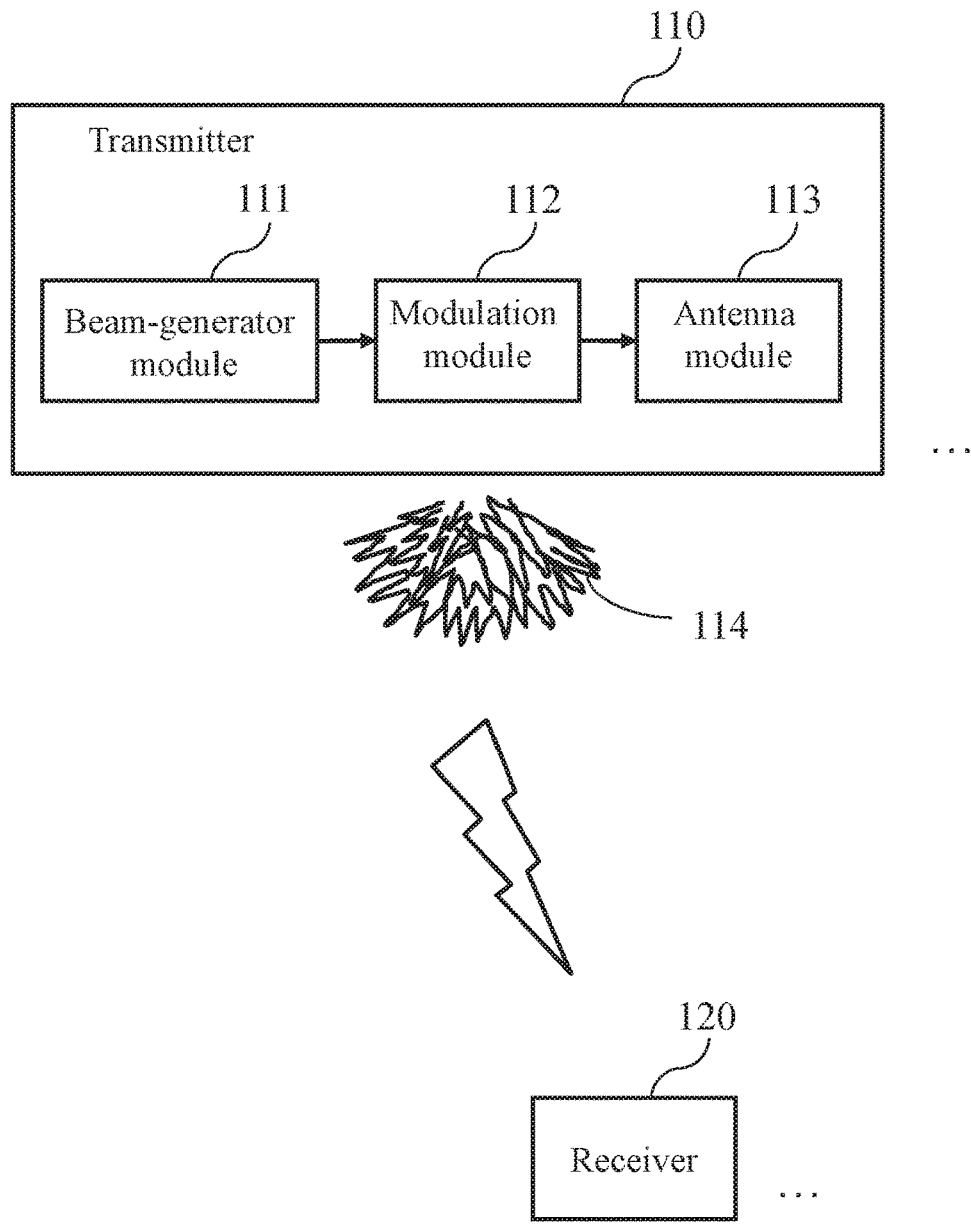
FIG. 1A is one system block diagram of a system for acquiring channel knowledge according to the present invention.

The following further describes the system for acquiring channel knowledge and the method thereof in the present invention with reference to the accompanying drawings. Referring to FIG. 1A first, FIG. 1A is a system block diagram of a system for acquiring channel knowledge according to the present invention. The system includes: at least one transmitter 110 and at least one receiver 120. In one implementation of the present invention, the at least one transmitter 110 refers to at least one base station (BS); and the at least one receiver 120 refers to at least one user equipment (UE) such as a mobile phone. Specifically, each transmitter 110 includes: a beam-generator module 111, a modulation module 112, and an antenna module 113. The beam-generator module 111 is configured to generate multiple directional beams in different directions, and it should be noted that these directional beams do not have to cover all possible directions. In one implementation of the present invention, these directions may be selected randomly, according to an empirical rule, or according to a priori channel knowledge.

The modulation module 112 is configured to modulate the directional beams in the different directions by means of at least one spreading sequence, so as to enlarge a beam range of each directional beam in the different directions and use the modulated directional beams as multiple training-specific 114 beams in the different directions. The spreading sequence may be a pseudo-random binary sequence with a preset spreading factor, for example: maximal length sequence, or a random-phased unimodular sequence with a preset spreading factor, for example: a Zadoff-Chu sequence. The spreading factor is used for controlling a range of beam, and this part is described in detail later.

The antenna module 113 configured to execute training by sweeping the training-specific beams 114 in the different directions by means of a plurality of antennas. In one implementation of the present invention, the antenna module 113 may form an antenna array, at least one group of radio frequency phase shifters, and at least one RF-chain. The antenna array is electrically connected to a baseband via the at least one group of radio frequency phase shifters and the at least one RF-chain. Each of the directional beams in the different directions is generated by utilizing multiple radio frequency phase shifters according to a corresponding direction. Meanwhile, to perform modulation, each radio frequency phase shifter performs phase shifting according to a corresponding entry of the at least one spreading sequence. On the other hand, according to different electrical connection manners, the antenna module 113 may be in a full-connection architecture or a sub-connection architecture. It should be particularly noted that, the antenna module 113 may continuously sweep these training-specific beams 114, or sweep these training-specific beams 114 only in a particular time slot.

It should be particularly noted that, if the UE includes the beam-generator module 111, the modulation module 112, and the antenna module 113, the UE may also be regarded as a transmitter 110 that applies the present invention. That is, the present invention does not limit that only the BS can serve as the transmitter 110, as long as devices including the beam-generator module 111, the modulation module 112, and the antenna module 113 do not depart from the application scope of the transmitter 110 in the present invention.

For the part of the at least one receiver 120, each receiver 120 is configured to measure at least one training-specific beam 114 from said at least one transmitter 110, and determine channel knowledge according to the measurement result and beam-related information associated with the at least one training-specific beam 114.

In one of exemplary implementation for performing beam training, the transmitter 110 may sweep a plurality of training-specific beams 114 in different directions. During the transmitter 110 sweeps the training-specific beams 114, the receiver 120 may collect measurement result from at least one training-specific beam 114 of the transmitter 110. Finally, the receiver 120 can utilize sparse optimization algorithms, or other similar algorithms based on compressive sensing, to determine channel knowledge according to the measurement result and beam-related information associated with the at least one training-specific beam 114. The beam-related information typically includes the direction and the spreading sequence corresponding to at least one training-specific beam 114.

Figure 1B:
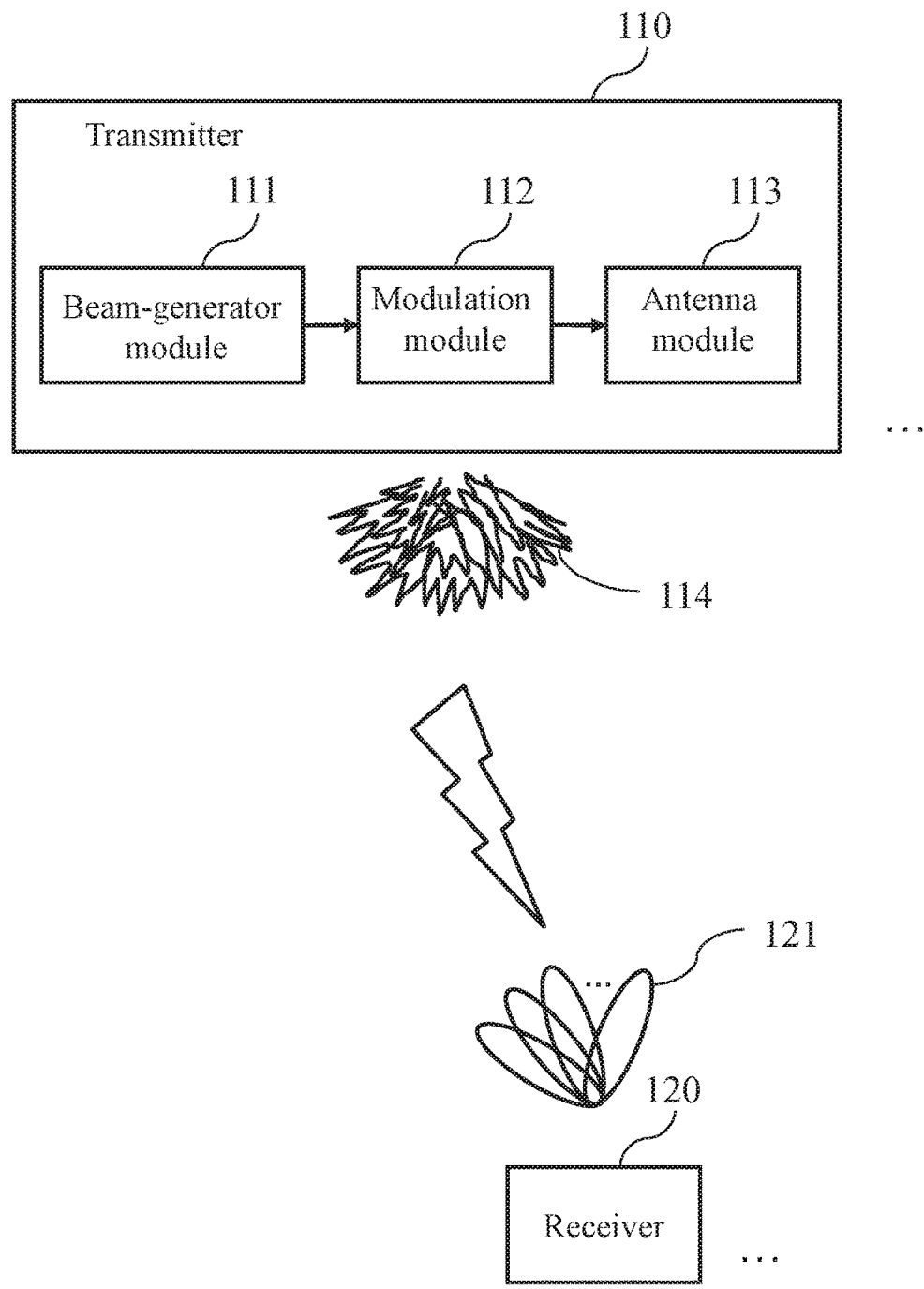
FIG. 1B is another system block diagram of a system for acquiring channel knowledge according to the present invention.

Referring to FIG. 1B, in one of exemplary implementation for performing beam training, the transmitter 110 may sweep a plurality of training-specific beams 114 in different directions, and the receiver 120 may sweep a plurality of combining beams 121 in different directions, respectively. During the transmitter 110 sweeps the training-specific beams 114, the receiver 120 may measure at least one training-specific beam 114 of the transmitter 110 via multiple combining beams 121 in different directions. Finally, the receiver 120 can utilize sparse optimization algorithms, or other similar algorithms based on compressive sensing to determine channel knowledge according to the measurement result and beam-related information associated with the at least one training-specific beam 114 and the combining beams 121. It should be particularly noted that, in another exemplary implementation, a method for forming combining beams 121 in different directions by the receiver 120 may be the same as a method for forming training-specific beams 114 in different directions by the transmitter 110. Therefore, the receiver 120 may sweep only a few said combining beams 121 in different directions to measure at least one training-specific beam 114 of the transmitter 110, and determine channel knowledge according to the measurement result and beam-related information associated with the at least one training-specific beam 114 and the combining beams 121, and further reduce the entire training overhead. The beam-related information typically includes the directions and the spreading sequences corresponding to the at least one training-specific beam 114 and the combining beams 121, respectively.

Figure 2:
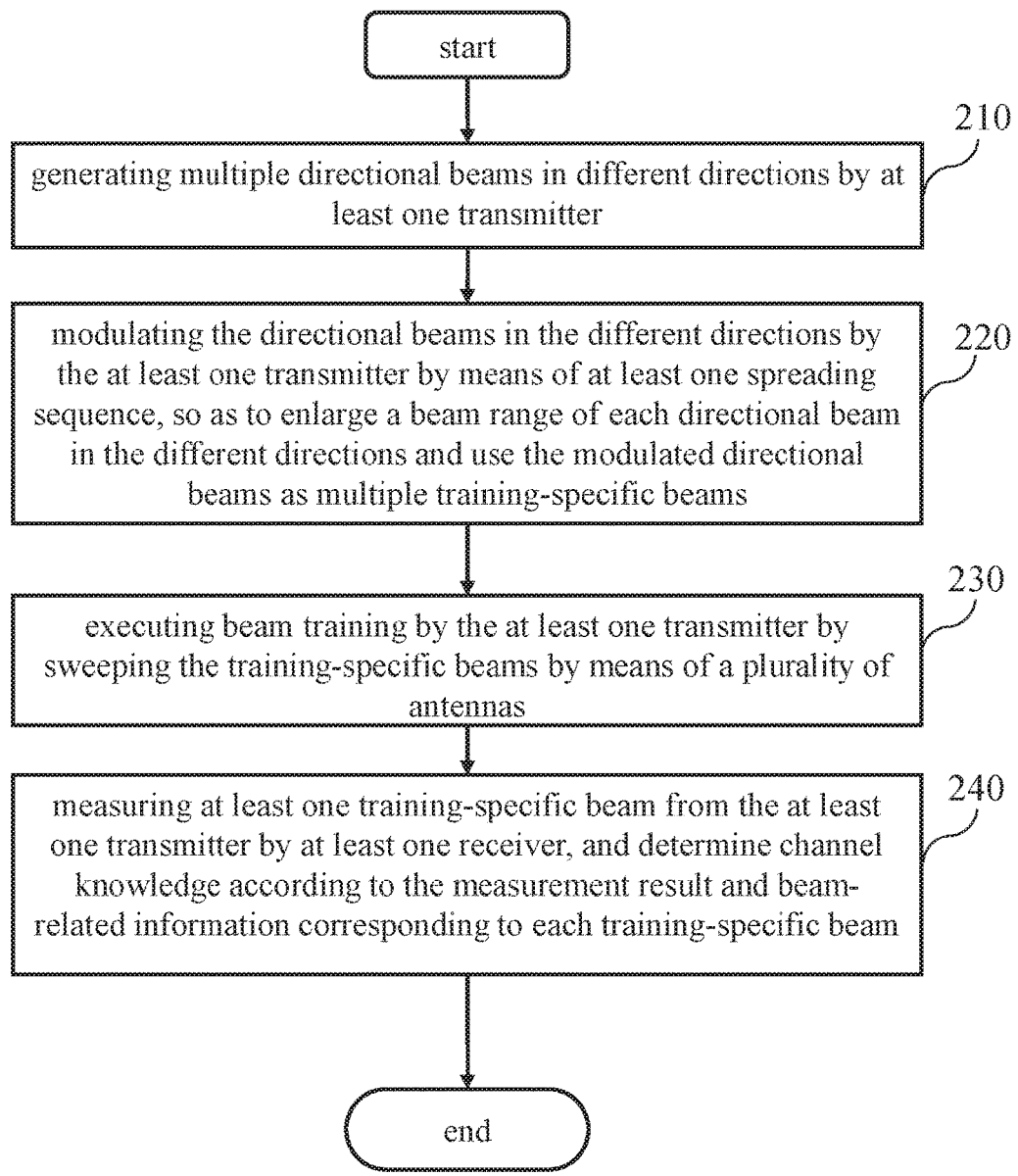
FIG. 2 is a method flowchart of a method for acquiring channel knowledge according to the present invention.

Next, referring to FIG. 2, FIG. 2 is a method flowchart of a method for acquiring channel knowledge according to the present invention, where the method is applied to an environment including at least one transmitter 110 and at least one receiver 120, and includes steps: generating multiple directional beams in different directions by the at least one transmitter 110 (step 210); modulating the directional beams in the different directions by the transmitter 110 by means of at least one spreading sequence, so as to enlarge a beam range of each directional beam in the different directions and use the modulated directional beams as training-specific beams in the different directions (step 220); executing beam training by the transmitter 110 by sweeping the training-specific beams in the different directions by means of a plurality of antennas (step 230); and measuring at least one training-specific beam from said at least one transmitter 110 by the at least one receiver 120, and determine channel knowledge according to the measurement result and beam-related information associated with the at least one training-specific beam (step 240). By means of the foregoing steps, the transmitter 110 may generate multiple directional beams in different directions, next, modulate the directional beams in the different directions by using at least one spreading sequence, so as to enlarge a beam range of each directional beam in the different directions and use the modulated directional beams as training-specific beams in the different directions, and execute training by sweeping the training-specific beams in the different directions by means of a plurality of antennas, so that the receiver 120 measures at least one training-specific beam from said at least one transmitter 110, and determine channel knowledge according to the measurement result and beam-related information associated with the at least one training-specific beam.

Figure 3:
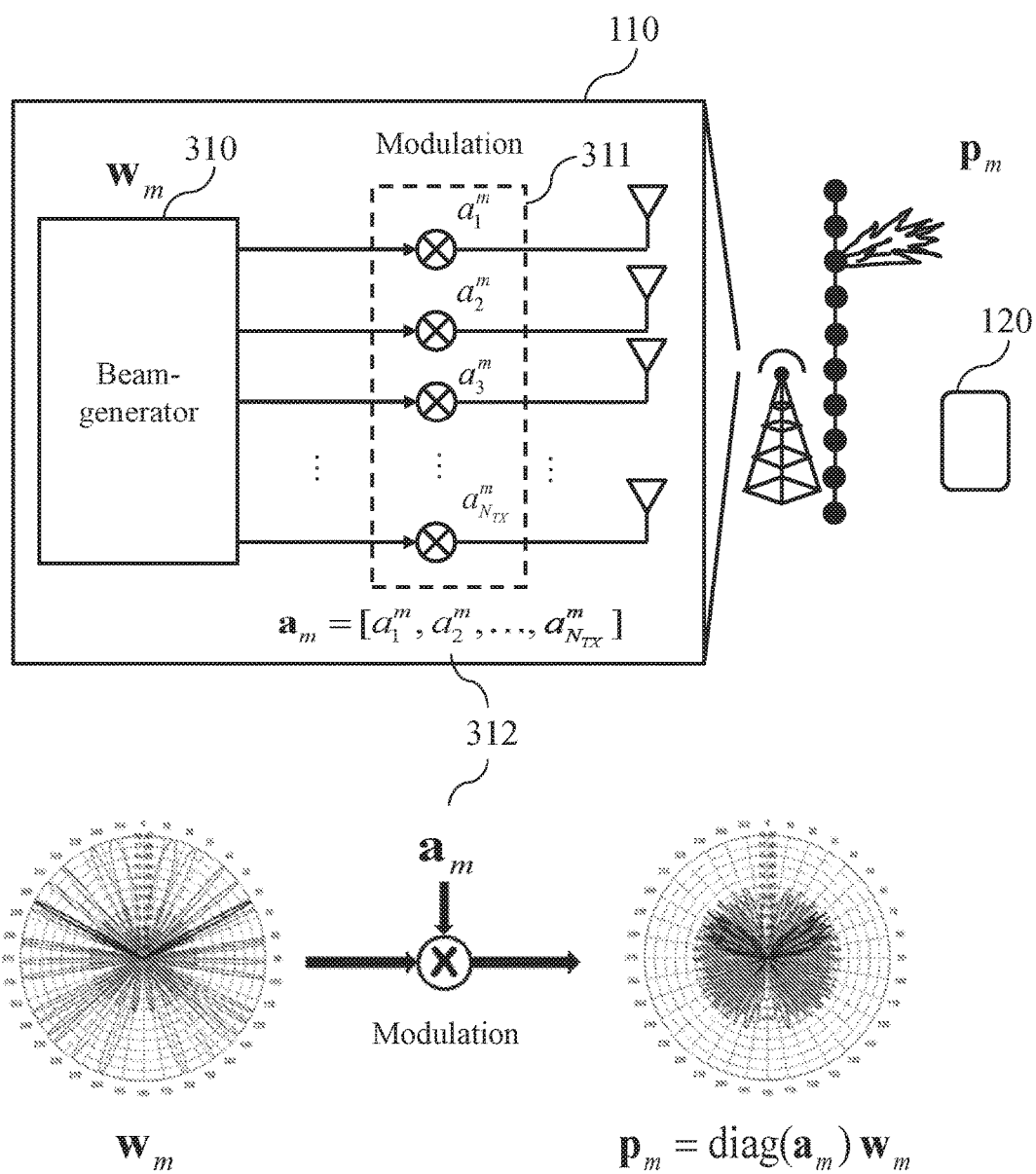
FIG. 3 is a schematic diagram of applying the present invention to generate training-specific beams in the different directions.

The following provides descriptions as follows in a manner of an embodiment with reference to FIG. 3 to FIG. 6. Referring to FIG. 3 first, FIG. 3 is a schematic diagram of applying the present invention to generate $M_{TX}$ training-specific beams $p_m$, m=1, 2, K,$M_{TX}$, in different directions. In an implementation of the present invention, a generation manner thereof the training-specific beams includes two parts: (1) first, a beam-generator 310 of a transmitter generates $M_{TX}$ directional beams $w_m$, m=1, 2, K,$M_{TX}$, in different directions; and (2) next, performs modulation 311 on the $M_{TX}$ directional beams $w_m$, m=1, 2, K,$M_{TX}$, in the different directions, that is, signals from each directional beam are multiplied by particular values before feeding to antenna array. By cascading these particular values for each directional beam, we have $M_{TX}$ sequences $a_m$, m=1, 2, K,$M_{TX}$, wherein a representation manner thereof is: $a_m = [a_1^m, a_2^m, \ldots, a_{TX}^m]$, m=1, 2, K,$M_{TX}$, wherein $N_{TX}$ is the number of antennas in the transmitter 110. These sequences are referred to as spreading sequences 312. Each spreading sequence 312 may be a pseudo-random binary sequence with a preset spreading factor, for example: maximal length sequence, or a random-phased unimodular sequence with a preset spreading factor, for example: a Zadoff-Chu sequence. After performing modulation 311, each original directional beam is enlarged to a wider training-specific beam in a random manner according to a spreading property and a spreading factor of the spreading sequence 312. During the transmitter 110 sweeps the $M_{TX}$ training-specific beams $p_m$, m=1, 2, K,$M_{TX}$, in the different directions, the receiver 120 can measure at least one of the $M_{TX}$ training-specific beams $p_m$, m=1, 2, K,$M_{TX}$ from the transmitter 110, and determine channel knowledge according to the measurement result and beam-related information associated with the at least one training-specific beam.

The foregoing mentioned spreading factor refers to: when the transmitter 110 is equipped with $N_{TX}$ antennas, and a pseudo-random binary sequence or a random-phased unimodular sequence with length $N_{CHIP}$ is employed as a spreading sequence 312. In this way, the spreading factor of the spreading sequence can be defined as $N_{CHIP}/N_{TX}$, wherein $N_{CHIP} \leq N_{TX}$, that is, $N_{CHIP}$ is not necessarily equal to $N_{TX}$. In one of exemplary implementation, assuming that a transmitter 110 is equipped with 64 antennas, and a pseudo-random binary sequence or a random-phased unimodular sequence with length 16, which can be represented as $[\alpha_1, \alpha_2, \ldots, \alpha_{16}]$, is employed as a spreading sequence 312. Therefore, the spreading factor of the spreading sequence is 0.25. The spreading sequence 312 can be represented as a=$[\alpha_1, \alpha_1, \alpha_1, \alpha_1, \alpha_2, \alpha_2, \alpha_2, \alpha_2, \ldots, \alpha_{16}, \alpha_{16}, \alpha_{16}, \alpha_{16}]$, but it should be noted that the spreading sequence of the present invention is not limited to this. A larger spreading factor indicates a larger beam range; on the contrary, a smaller spreading factor indicates a smaller beam range. When beam training needs to be performed on a wider spatial area, the spreading factor may be configured to enlarge a larger beam range. However, it should be noted that, a larger beam range indicates a smaller main-lobe directivity gain.

In one of example implementations, a plurality of directional beams in different directions generated by beam-generator module 111 may be modulated with a same spreading sequence, and these modulated directional beams are used as multiple training-specific beams in the different directions. Generally, only a few training-specific beams are required for acquiring channel knowledge, and later, further description is provided with reference to the accompanying drawings. In the other example implementation, a plurality of directional beams in different directions generated by beam-generator module 111 may also be modulated with different spreading sequences, and these modulated directional beams are used as multiple training-specific beams in the different directions. In other words, besides utilizing a same spreading sequence, multiple spreading sequences may also be utilized for modulation.

Figure 4:
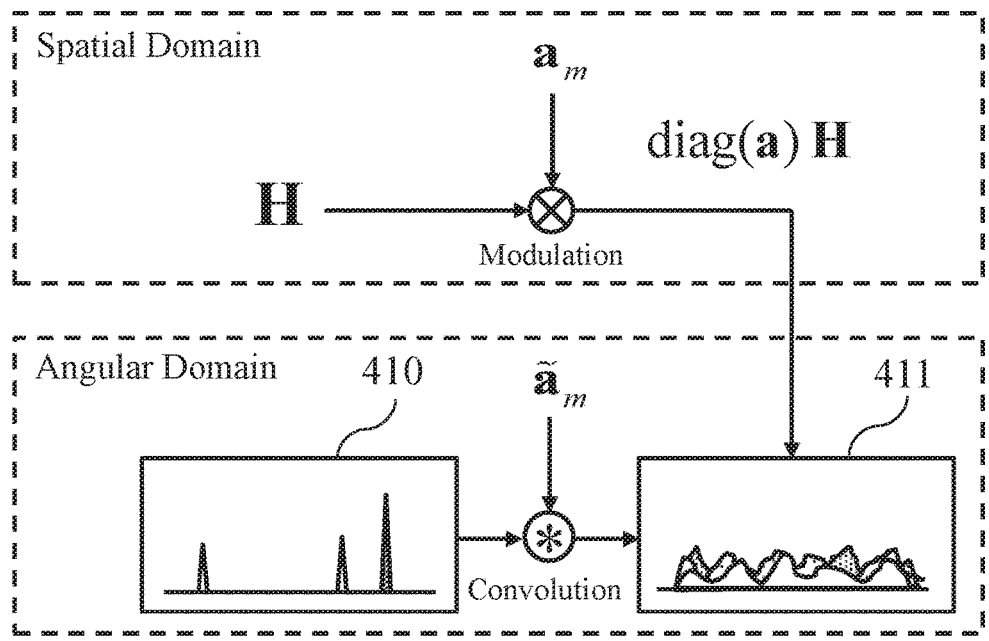
FIG. 4 is a schematic diagram of an equivalent mathematical model for applying the present invention to acquire channel knowledge.

Referring to FIG. 4, FIG. 4 is a schematic diagram of an equivalent mathematical model for applying the present invention to acquire channel knowledge. Why we can use only a few training-specific beams disclosed in the present invention to acquire channel knowledge? It is mainly based on a technology in compressive sensing, which is referred to as random convolution sampling. For a physical channel with sparse nature, information is usually distributed on a few directions in the physical channel, which can be represented in an angular domain spectrum 410. When the modulation acts on the physical channel with sparse nature in a spatial domain, information distributed on a few directions is spread uniformly and randomly across the angular domain spectrum 411. The principle is similar to spread-spectrum (SS) technology, in which a signal generated with a particular frequency tone is deliberately spread in a frequency domain spectrum by modulated with a spreading sequence in a time domain, resulting in a signal with a wider bandwidth. Since modulation in a time domain is equivalent to convolution in a frequency domain, the modulation in a spatial domain can be seen as convolution in an angular domain.

Next, based on the theory of random convolution sampling, once the information of the physical channel with sparse nature is spread out in the angular domain 411, channel knowledge can be determined from only a few samples in the angular domain by utilizing a sparse optimization algorithm, or other similar algorithms based on compressive sensing. The sampling in the angular domain is implemented by a beam-generator (or beam-generator module), which generates multiple directional beams in different directions. Since the channel knowledge can be determined from only a few samples in the angular domain, we can avoid sampling the entire angular domain spectrum, like exhaustive search method. After collecting at least one sampling result, that is, a receiver measures at least one training-specific beam from a transmitter, channel knowledge can be determined according to the measurement result and beam-related information associated with the at least one training-specific beam. A major difference of this manner from the aforementioned exhaustive search and hierarchical search methods is that the manner in the present invention ensures that a receiver can obtain a part of channel information from each measurement of a training-specific beam. However, exhaustive search and hierarchical search methods may waste a measurement when a directional beam is swept to a direction in which no propagation path exists. Therefore, the manner in the present invention requires less training overhead compared to exhaustive search and hierarchical search methods, especially when propagation paths are sparse in physical channels.

Since the manner of beam training in the present invention does not need any feedback within beam sweeping procedure, like exhaustive search method, it enables training multiple user equipments simultaneously. To be more specific, the training-specific beams are broadcast to all destination user equipments with no feedback. Then, each user equipment dedicates to determine its channel knowledge according to the measurement result and beam-related information associated with the at least one training-specific beam. In light of this, its training overhead is not scaled with the increasing of user equipments. Therefore, for multi-user cellular systems, the manner of beam training in the present invention is a better option compared to the exhaustive search method.

Figure 5:
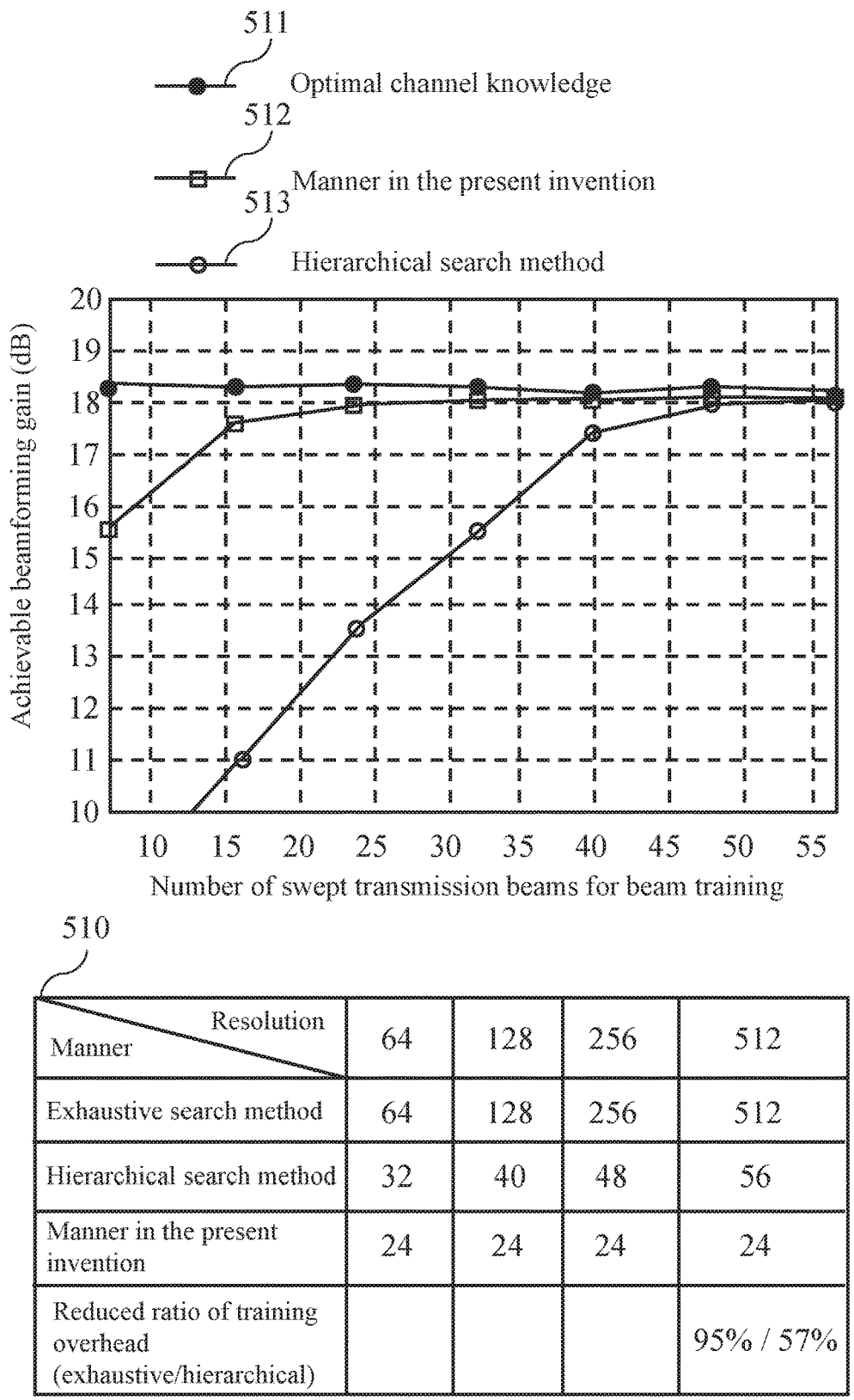
FIG. 5 is a schematic diagram of a comparison between training overheads of the present invention and those of the prior art.

As shown in FIG. 5, FIG. 5 is a schematic diagram of a comparison between training overheads of the present invention and those of the prior art. As mentioned above, the manner of beam training in the present invention requires only a few training-specific beams to acquire channel knowledge. In this simulation, a base station and a user equipment are equipped with 64 and 16 antennas, respectively. There are four dominant propagation paths in this physical channel, and a reception signal to noise ratio (SNR) is 0 dB. The present invention and those of the prior art have to determine the four dominant propagation paths and determine the four desirable directional associated with the four dominant propagation paths from 512 candidate directional beams. In FIG. 5, beamforming gains achieved by sweeping different number of beams for beam training are compared, wherein a lateral axis indicates the number of swept transmission beams for beam training; and a value axis indicates the achievable beamforming gain. As can be clearly seen in FIG. 5, more accurate directions of the four dominant propagation paths may be determined by sweeping more beams for beam training, and achievable beamforming gains can be increased. The first line segment 511 is an optimal bound with a maximum beamforming gain achieved with perfect channel knowledge. As can be clearly seen in FIG. 5, hierarchical search method is shown as a third line segment 513, which may gradually approximate an optimal beamforming gain with an increase of the number of swept transmission beams for beam training, and reaches the near-optimal beamforming gain when 56 transmission beams are swept. The manner in the present invention is shown as a second line segment 512, and may reach the near-optimal beamforming gain by sweeping about 24 training-specific beams. Consequently, the table 510 indicates the manner in the present invention can reduce about 95% of the training overhead compared to exhaustive search method, and can reduce about 57% of the training overhead compared to hierarchical search method.

Figure 6:
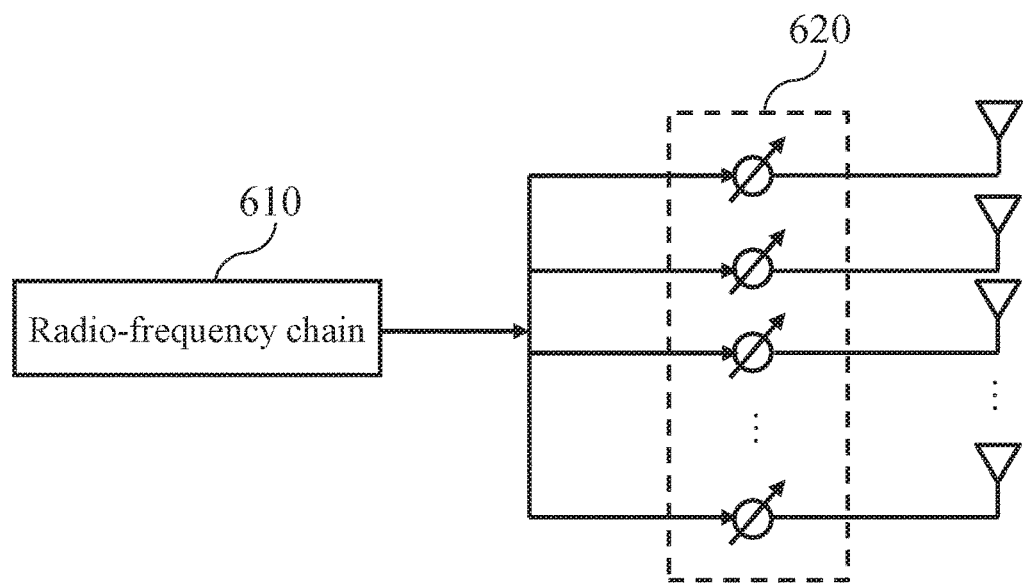
FIG. 6 is a schematic diagram of applying the present invention to generate directional beams and perform modulation by using multiple radio frequency phase shifters in one of exemplary implementations.

Referring to FIG. 6, FIG. 6 is a schematic diagram of applying the present invention to generate directional beams and perform modulation by using multiple radio frequency phase shifters in one of exemplary implementations. In this exemplary implementation, a group of radio frequency phase shifters 620 is driven by one RF-chain 610. A beam-generator (or beam-generator module) may utilize the group of radio frequency phase shifters 620 to generate multiple directional beams in different directions. Each of the directional beams in the different directions is generated by utilizing the group of radio frequency phase shifters 620 according to a corresponding direction. Meanwhile, a modulation (modulation module) can also be implemented by using the group of radio frequency phase shifters 620 to modulate the directional beams in the different directions by means of at least one spreading sequence, so as to enlarge a beam range of each directional beam in the different directions and use the modulated directional beams as multiple training-specific beams in the different directions. When performing modulation, each radio frequency phase shifter performs phase shifting according to a corresponding entry of the at least one spreading sequence. Therefore, the two parts of generating directional beams in different directions and performing modulation by means of at least one spreading sequence may be implemented together by a group of radio frequency phase shifters 620. Since only one group of radio frequency phase shifters 620 need to be utilized, the two parts can be implemented in an antenna array with sub-connection architecture.

In conclusion, as can be known, a difference of the present invention from the prior art lies in: at least one transmitter generates multiple directional beams in different directions, and modulates the directional beams in the different directions by means of at least one spreading sequence, so as to enlarge a beam range of each directional beam in the different directions and use the modulated directional beams as training-specific beams in the different directions, and executes beam training by sweeping the training-specific beams in the different directions by means of a plurality of antennas, so that at least one receiver measures at least one training-specific beam from said at least one transmitter, and determine channel knowledge according to the measurement result and beam-related information associated with the at least one training-specific beam. By means of the technical solutions, the problem exists in the prior art can be resolved, and a technical effect of reducing training overhead can be further achieved.

What is claimed is:

1. A system for acquiring channel knowledge, wherein the system comprises:
   at least one transmitter, where the at least one transmitter comprises:
      a beam-generator module, configured to generate multiple directional beams in different directions;
      a modulation module, configured to modulate said directional beams in the different directions with at least one spreading sequence, so as to enlarge a beam range of each directional beam in the different directions and use the modulated directional beams as multiple training-specific beams in the different directions; and
      an antenna module, configured to execute beam training by sweeping the multiple training-specific beams in the different directions by using a plurality of antennas; and
   at least one receiver, the at least one receiver is configured to measure at least one of the multiple training-specific beams from said at least one transmitter, and determine channel knowledge according to the measurement result and beam-related information associated with the at least one of the multiple training-specific beams.

2. The system for acquiring channel knowledge according to claim 1, wherein said at least one spreading sequence is a pseudo-random binary sequence or a random-phased unimodular sequence with a preset spreading factor, and each directional beam is collocated with different spreading sequences or a same spreading sequence, wherein the spreading factor is used for controlling a range of beam.

3. The system for acquiring channel knowledge according to claim 1, wherein said at least one receiver sweeps multiple combining beams in different directions to measure said at least one of the multiple training-specific beams from said at least one transmitter, and determine channel knowledge according to the measurement result and beam-related information associated with the at least one of the multiple training-specific beams and the multiple combining beams.

4. The system for acquiring channel knowledge according to claim 3, wherein said at least one receiver generates the multiple combining beams in different directions in the same manner of generating the multiple training-specific beams in the different directions, and measures said at least one of the multiple training-specific beams from said at least one transmitter by using the multiple combining beams in the different directions.

5. The system for acquiring channel knowledge according to claim 1, wherein each of directional beams in the different directions is generated by utilizing multiple radio frequency phase shifters according to a corresponding direction.

6. The system for acquiring channel knowledge according to claim 5, wherein when performing modulation, each radio frequency phase shifter performs phase shifting according to a corresponding entry of the at least one spreading sequence.

7. The system for acquiring channel knowledge according to claim 1, wherein said multiple directional beams in different directions do not have to cover all possible directions.

8. A method for acquiring channel knowledge, wherein the method is applied to an environment comprising at least one transmitter and at least one receiver, and comprises steps:
   generating multiple directional beams in different directions by said at least one transmitter;

modulating said multiple directional beams in the different directions by the at least one transmitter with at least one spreading sequence, so as to enlarge a beam range of each directional beam in the different directions and use the modulated directional beams as multiple training-specific beams in the different directions;

executing beam training by said at least one transmitter by sweeping the multiple training-specific beams in the different directions by using a plurality of antennas; and measuring at least one of the multiple training-specific beams from said at least one transmitter, and determine channel knowledge according to the measurement result and beam-related information associated with the at least one of the multiple training-specific beams.

9. The method for acquiring channel knowledge according to claim 8, wherein said at least one spreading sequence is a pseudo-random binary sequence or a random-phased unimodular sequence with a preset spreading factor, and each directional beam is collocated with different spreading sequences or a same spreading sequence, wherein the spreading factor is used for controlling a range of beam.

10. The method for acquiring channel knowledge according to claim 8, wherein said at least one receiver sweeps multiple combining beams in different directions to measure said at least one of the multiple training-specific beams from said at least one transmitter, and determine channel knowledge according to the measurement result and beam-related information associated with the at least one of the multiple training-specific beams and the multiple combining beams.

11. The method for acquiring channel knowledge according to claim 10, wherein said at least one receiver generates the multiple combining beams in different directions in the same manner of generating the multiple training-specific beams in the different directions, and measures said at least one of the multiple training-specific beams from said at least one transmitter by using the multiple combining beams in the different directions.

12. The method according for acquiring channel knowledge according to claim 8, wherein each of the directional beams in the different directions is generated by utilizing multiple radio frequency phase shifters according to a corresponding direction.

13. The method for acquiring channel knowledge according to claim 12, wherein when performing modulation, each radio frequency phase shifter performs phase shifting according to a corresponding entry of the at least one spreading sequence.

14. The method for acquiring channel knowledge according to claim 8, wherein said multiple directional beams in different directions do not have to cover all possible directions.

* * * * *